US010097868B2

(12) United States Patent
Loghin et al.

(10) Patent No.: US 10,097,868 B2
(45) Date of Patent: Oct. 9, 2018

(54) DATA PROCESSING DEVICE AND DATA PROCESSING METHOD

(71) Applicant: SONY CORPORATION, Tokyo (JP)

(72) Inventors: Muhammad Nabil Sven Loghin, Tokyo (JP); Satoshi Okada, Tokyo (JP); Lothar Stadelmeier, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/101,332

(22) PCT Filed: Nov. 27, 2014

(86) PCT No.: PCT/JP2014/081329
§ 371 (c)(1),
(2) Date: Jun. 2, 2016

(87) PCT Pub. No.: WO2015/087703
PCT Pub. Date: Jun. 18, 2015

(65) Prior Publication Data
US 2016/0301952 A1 Oct. 13, 2016

(30) Foreign Application Priority Data
Dec. 9, 2013 (JP) ................................ 2013-253752

(51) Int. Cl.
*H04N 21/236* (2011.01)
*H04N 21/2385* (2011.01)
(Continued)

(52) U.S. Cl.
CPC ....... *H04N 21/236* (2013.01); *H04N 21/2362* (2013.01); *H04N 21/2385* (2013.01);
(Continued)

(58) Field of Classification Search
CPC combination set(s) only.
See application file for complete search history.

(56) References Cited

U.S. PATENT DOCUMENTS

2009/0164793 A1\* 6/2009 Yoshioka ............. H04N 7/1675
713/180
2011/0154425 A1 6/2011 Kim et al.
(Continued)

FOREIGN PATENT DOCUMENTS

| EP | 2184900 A1 | 5/2010 |
| EP | 2639993 A2 | 9/2013 |
| JP | 2013-520035 A | 5/2013 |

OTHER PUBLICATIONS

ETSI EN 302 307, Digital Video Broadcasting (DVB); Second generation farming structure, channel coding and modulation systems for Broadcasting, Interactive Services, News Gathering and other broadband satellite applications (DVB-S2), EBU, Digital Video Broadcasting, Total 84 Pages, (Mar. 2013).

(Continued)

*Primary Examiner* — Kieu Oanh T Bui
(74) *Attorney, Agent, or Firm* — Oblon, McClelland, Maier & Neustadt, L.L.P.

(57) ABSTRACT

The present technology relates to a data processing device and a data processing method capable of performing appropriate stream processing.
An input stream is split into a split stream for each of a plurality of channels. A stream to be generated includes the split stream, and signature information unique for each of the input streams containing the split stream, or includes the split stream, the signature information, and location information about a transmission frequency band of a split stream constituting the input stream and different from the split stream included in the generated stream. The present technology is applicable to a channel bonding (CB) technology
(Continued)

which splits an input stream into streams of a plurality of channels and transmits the split streams, for example.

10 Claims, 12 Drawing Sheets

(51) Int. Cl.
    *H04N 21/434*     (2011.01)
    *H04N 21/845*     (2011.01)
    *H04N 21/2362*     (2011.01)
    *H04N 21/647*     (2011.01)
    *H04N 21/242*     (2011.01)
    *H04N 21/61*     (2011.01)

(52) U.S. Cl.
    CPC ......... *H04N 21/434* (2013.01); *H04N 21/615* (2013.01); *H04N 21/64707* (2013.01); *H04N 21/8456* (2013.01); *H04N 21/242* (2013.01); *H04N 21/6143* (2013.01)

(56) References Cited

U.S. PATENT DOCUMENTS

| | | | |
|---|---|---|---|
| 2011/0296440 A1* | 12/2011 | Laurich | G06F 21/602 |
| | | | 719/326 |
| 2012/0307842 A1 | 12/2012 | Petrov et al. | |
| 2013/0174209 A1 | 7/2013 | Jung et al. | |

OTHER PUBLICATIONS

ETSI EN 302 755, "Digital Video Broadcasting (DVB); Frame structure channel coding and modulation for a second generation digital terrestrial television broadcasting system (DVB-T2)", V1.3.1, EBU-UER, Digital Video Broadcasting, Total 8 Pages, (Apr. 2012).

International Search Report dated Mar. 10, 2015 in PCT/JP14/081329 Filed Nov. 27, 2014.

Office Action (Written Opinion) dated Jun. 20, 2017, in Singapore Patent Application No. 11201604498X.

Extended European Search Report dated Jun. 9, 2017, in European Patent Application No. 14869096.9.

DVB Organization: "TM4937_S2_preso_to_TM95.pdf", DVB, Digital Video Broadcasting, C/O EBU—17A Ancienne Route—CH-1218 Grand Saconnex, Geneva—Switzerland, Oct. 21, 2013 (Oct. 21, 2013), XP017842245.

DVB Organization: "TM4941_Draft_S2-X_Specification.pdf", DVB, Digital Video Broadcasting, C/O EBU—17A Ancienne Route—CH-1218 Grand Saconnex, Geneva—Switzerland, Oct. 21, 2013 (Oct. 21, 2013), XP017842249.

Woongshik You, et al., "*UHDTV Transmission Based on Broadcasting Channel Bonding*", Consumer Electronics (ICCE), 2013 IEEE International Conference On, IEEE, Jan. 11, 2013 (Jan. 11, 2013), pp. 405-406, XP032348820.

* cited by examiner

FIG. 8

| S0 | S1...7 | policy |
|---|---|---|
| 0 | Undefined | No channel bonding |
| 1 | Signature | Channel bonding on |

FIG. 9

| s0 | s1 | s2..7 | policy |
|---|---|---|---|
| 0 | 0 | Undefined | No channel bonding |
| 0 | 1 | Signature | N=2; next channel at higher frequency than current channel |
| 1 | 0 | Signature | N=2; next channel at lower frequency than current channel |
| 1 | 1 | Signature | N=3; next 2 channels undefined |

FIG. 10

| s0 | s1 | s2 | s3...7 | policy |
|---|---|---|---|---|
| 0 | 0 | 0 | Undefined | No channel bonding |
| 0 | 0 | 1 | Signature | N=2;next channel at higher frequency than current channel |
| 0 | 1 | 0 | Signature | N=2;next channel at lower frequency than current channel |
| 0 | 1 | 1 | Undefined | not used |
| 1 | 0 | 0 | Undefined | not used |
| 1 | 0 | 1 | Signature | N=3;both channels at higher frequencies |
| 1 | 1 | 0 | Signature | N=3;both channels at lower frequencies |
| 1 | 1 | 1 | Signature | N=3;one channel at higher, one at lower frequency |

DATA PROCESSING DEVICE AND DATA PROCESSING METHOD

TECHNICAL FIELD

The present technology relates to a data processing device and a data processing method, and more particularly to a data processing device and a data processing method capable of performing appropriate stream processing, for example.

BACKGROUND ART

For example, DVB-S2 (DVB: Digital Video Broadcasting) adopted in European countries and other regions is known as a digital broadcasting system (Non-Patent Document 1).

CITATION LIST

Non-Patent Document

Non-Patent Document 1: DVB-S.2: ETSI EN 302 307 V1.3.1 (2013-03)

SUMMARY OF THE INVENTION

Problems to be Solved by the Invention

One of technologies for transmitting a high-data-rate stream in digital broadcasting is a channel bonding (CB) technology which splits a high-data-rate stream into streams of a plurality of channels and transmits the split streams from the transmission side, and reconstructs the split streams of the plurality of channels into the original high-data-rate stream on the receiving side.

At present, standards called DVB-S2x (or DVB-S.2 evo) is under preparation as improved standards from DVB-S2. Utilization of the CB technology for DVB-S2x has been investigated.

However, details of the CB technology are not yet defined, wherefore appropriate stream processing may be difficult in digital broadcasting such as DVB-S2x even by use of the CB technology.

The present technology has been developed in consideration of the aforementioned circumstances, aiming at realization of appropriate stream processing.

Solutions to Problems

A first data processing device according to the present technology includes: a split unit that splits an input stream into a split stream for each of a plurality of channels; and a generation unit that generates a stream including the split stream, and signature information unique for each of the input streams containing the split stream.

A first data processing method according to the present technology includes steps of: splitting an input stream into a split stream for each of a plurality of channels; and generating a stream including the split stream, and signature information unique for each of the input streams containing the split stream.

The foregoing first data processing device and data processing method split an input stream into a split stream for each of a plurality of channels, and generate a stream including the split stream, and signature information unique for each of the input streams containing the split stream.

A second data processing device according to the present technology includes a processing unit that processes a stream transmitted from a transmitting device. The transmitting device includes a split unit that splits an input stream into a split stream for each of a plurality of channels, and a generation unit that generates a stream including the split stream, and signature information unique for each of the input streams containing the split stream.

A second data processing method according to the present technology includes a step of processing a stream transmitted from a transmitting device. The transmitting device includes a split unit that splits an input stream into a split stream for each of a plurality of channels, and a generation unit that generates a stream including the split stream, and signature information unique for each of the input streams containing the split stream.

The foregoing second data processing device and data processing method process a stream transmitted from a transmitting device including a split unit that splits an input stream into a split stream for each of a plurality of channels, and a generation unit that generates a stream including the split stream, and signature information unique for each of the input streams containing the split stream.

The data processing device may be an individual device, or an internal block constituting one device.

Effects of the Invention

According to the present technology, appropriate stream processing is achievable.

Advantages to be offered are not limited to these advantages, but may be any of advantages described in the present disclosure.

BRIEF DESCRIPTION OF DRAWINGS

FIG. 8 is a view illustrating a first example of CB signaling.

FIG. 9 is a view illustrating a second example of CB signaling.

FIG. 10 is a view illustrating a third example of CB signaling.

MODE FOR CARRYING OUT THE INVENTION

Transmission System According to Embodiment of Present Technology

Figure 1:
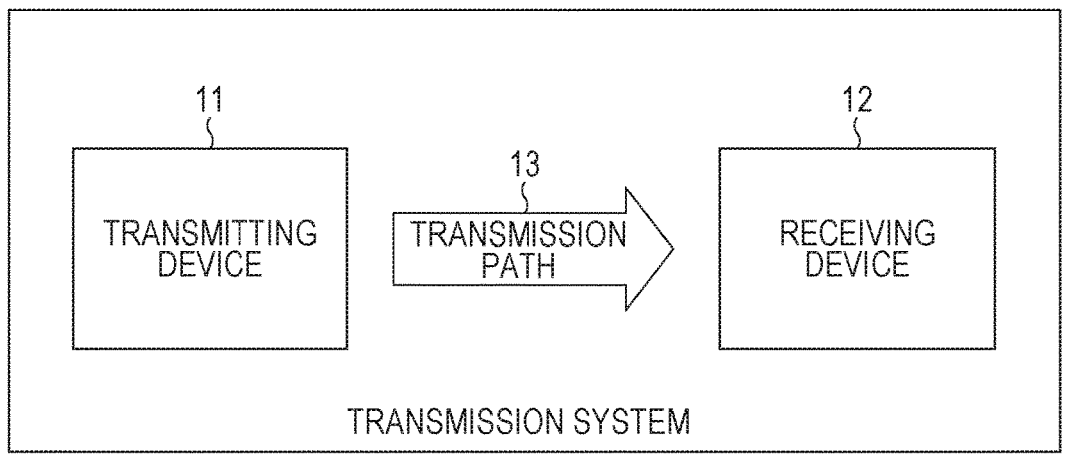
FIG. 1 is a block diagram illustrating a configuration example of a transmission system according to an embodiment of the present technology.

FIG. 1 is a block diagram illustrating a configuration example of a transmission system according to an embodiment of the present technology (system in this context is a logical collection of a plurality of devices disposed either within an identical housing or not).

The transmission system illustrated in FIG. 1 is constituted by a transmitting device 11 and a receiving device 12.

The transmitting device 11 performs transmission of television broadcasting programs, (including digital broadcasting and data transmission), for example. More specifically, the transmitting device 11 splits a stream of target data corresponding to a transmission target, such as image data and audio data provided as a program, into streams of a plurality of channels by utilizing a CB technology, and sends (transmits) the split streams via a transmission path 13 such as a satellite channel, a terrestrial channel, and a cable (wired channel), for example.

The receiving device 12 receives streams of a plurality of channels transmitted from the transmitting device 11 via the transmission path 13, reconstructs the original stream, and outputs the reconstructed stream.

The transmitting device 11 corresponds to a broadcasting station of television broadcasting, for example, while the receiving device 12 corresponds to a TV set (television receiver) at home. Accordingly, the transmitting device 11 in the transmission system may be constituted by a plurality of devices, rather than only a single device. Similarly, the receiving device 12 may be constituted by a plurality of devices.

<Configuration Example of Transmitting Device 11>

Figure 2:
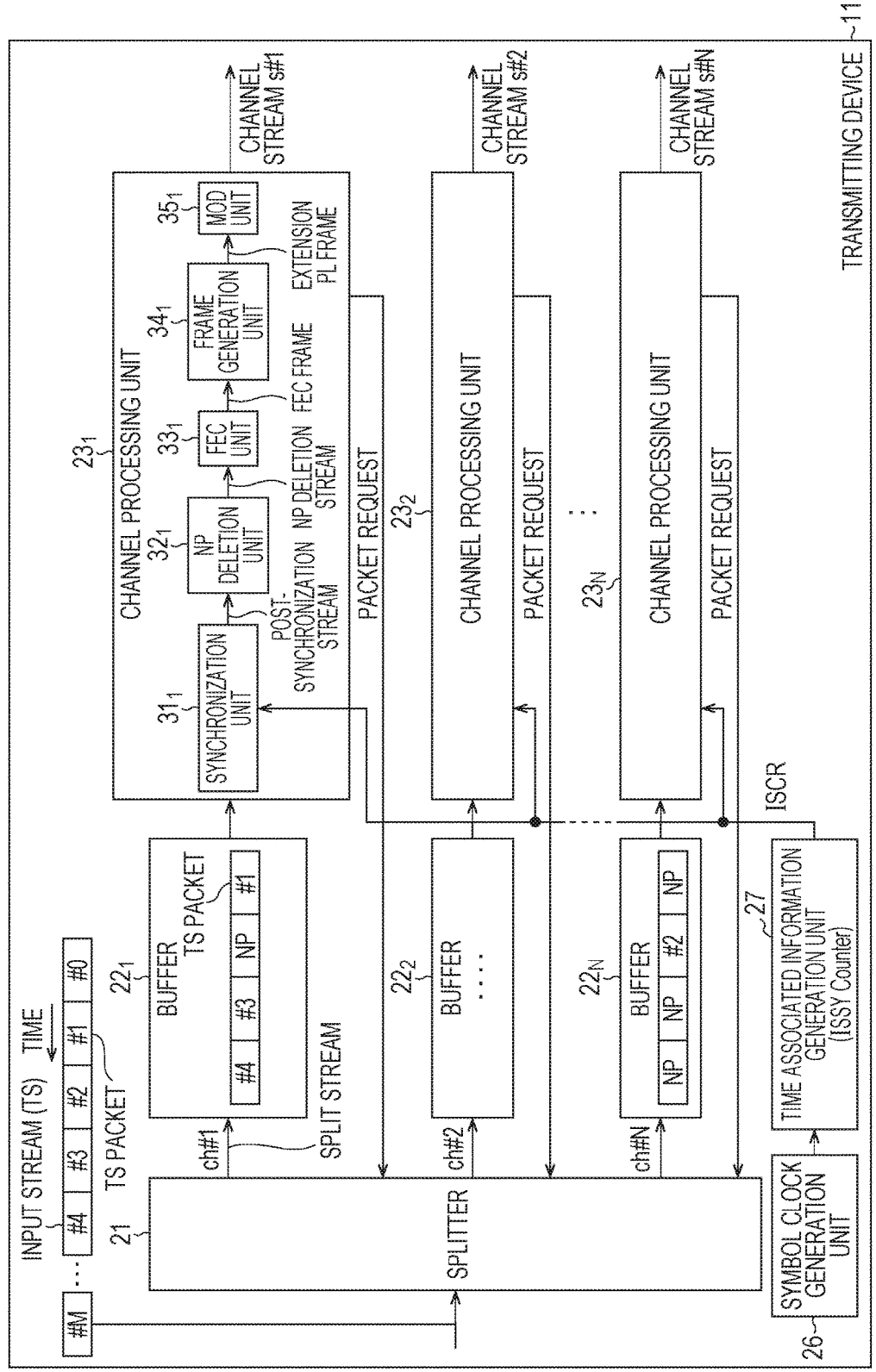
FIG. 2 is a block diagram illustrating a configuration example of a transmitting device 11.

FIG. 2 is a block diagram illustrating a configuration example of the transmitting device 11 in FIG. 1.

As illustrated in FIG. 2, the transmitting device 11 includes a splitter 21, N buffers $22_1$ through $22_N$, N channel processing units $23_1$ through $23_N$, a symbol clock generation unit 26, and a time associated information generation unit 27.

The transmitting device 11 receives a stream of target data as an input stream, such as a high-data-rate transport stream (TS) of 100 Mega bit per second (Mbps) constituted by a plurality of TS packets, such as #0, #1 . . . . The transmitting device 11 splits the input stream into split streams of N (or a smaller number of) channels constituting the plurality of channels by using a CB technology, and transmits the split streams.

The splitter 21 receives the input stream. The splitter 21 receives the input stream supplied thereto, and splits the received input stream into split streams of N (or a smaller number of) channels ch#1 through ch#N.

More specifically, the splitter 21 distributes the TS packets of the input stream to one of the N channels ch#1 through ch#N and null packets (NP) to all of the other channels, and repeats these distributions for the respective TS packets of the input stream to split the input stream into split streams of the N channels ch#1 through ch#N.

The splitter 21 supplies the split stream (packets of split stream) of the channel ch#n (nth channel) to the buffer $22_n$ in response to a request (packet request) issued from the channel processing unit $23_n$.

The buffer 22 is an FIFO (First In First Out), for example, which sequentially stores the split stream (packets of split stream) of the channel ch#n received from the splitter 21, and supplies the stored split stream of the channel ch#n to the channel processing unit $23_n$.

The channel processing unit $23_n$ processes the split stream of the channel ch#n received from the buffer $22_n$, and transmits a channel stream s#n of the channel ch#n obtained by the processing.

The channel processing unit $23_n$ includes a synchronization unit $31_n$, a null packet (NP) deletion unit $32_n$, a forward error correction (FEC) unit $33_n$, a frame generation unit $34_n$, and a modulation (MOD) unit $35_n$.

The synchronization unit $31_n$ receives the split stream of the channel ch#n from the buffer $22_n$, and input stream time reference (ISCR) from the time associated information generation unit 27, for example. This ISCR indicates transmission time of the packets, and corresponds to one of input stream synchronizer (ISSY) specified in DVB-S2 and others as time associated information associated with transmission time of the packets.

The synchronization unit $31_n$ adds ISCR, which has been supplied from the time associated information generation unit 27 at the time of supply of the packets to the synchronization unit $31_n$, to each end of the packets of the split stream of the channel ch#n received from the buffer $22_n$, and supplies the resultant split stream to the NP deletion unit $32_n$ as a post-synchronization stream of the channel ch#n.

The NP deletion unit $32_n$ deletes NPs from the post-synchronization split stream of the channel ch#n (split stream containing ISCR for each packet) received from the synchronization unit $31_n$, and supplies the resultant split stream to the FEC unit $33_n$ as an NP deletion stream of the channel ch#n.

After the NP deletion unit $32_n$ deletes NPs from the post-synchronization stream in the manner described above, the resultant data rate of the NP deletion stream becomes lower than the data rate of the input stream by a volume of the deleted NPs. Accordingly, the transmission band for transmission of the NP deletion stream of one channel becomes narrower than the transmission band for transmission of the input stream.

The FEC unit $33_n$ adds a base band (BB) header to one or more packets of the NP deletion stream of the channel ch#n supplied from the NP deletion unit $32_n$, and further adds in-band signaling specified in DVB-T2 and others to the packet or packets as necessary to generate a stream of a BB frame specified in DVB-S2 and others, for example.

The FEC unit $33_n$ further performs error correction encoding such as BCH encoding and LDPC encoding for a target of a BB frame.

The FEC unit $33_n$ obtains an FEC frame of the channel ch#n by error correction encoding for the BB frame, and maps the FEC frame in units of a symbol constituted by a predetermined number of bits to signal points on a constellation defined by a modulation system of predetermined quadrature modulation. The FEC unit $33_n$ supplies a stream of the resultant FEC frame of the channel ch#n to the frame generation unit $34_n$.

The frame generation unit $34_n$ generates an extension physical layer (PL) header of a PL frame of DVB-S2, for example.

This extension PL header contains an encoding rate (COD) of error correction encoding performed by the FEC unit $33_n$, MODCOD indicating the modulation system (MOD) of quadrature modulation for the mapping performed by the FEC unit $33_n$, a code length of an error correction code obtained by error correction encoding performed by the FEC unit $33_n$, and TYPE indicating the presence or absence of a pilot signal.

The extension PL header further contains CB signaling used for signaling signature information and location information corresponding to information about CB as described below.

The frame generation unit $34_n$ adds the extension PL header to the FEC frame of the channel ch#n supplied from the FEC unit $33_n$, for example, to generate a stream of a PL frame containing the extension PL header (hereinafter also referred to as extension PL frame), and supplies the generated stream to the MOD unit $35_n$, for example.

The MOD unit $35_n$ performs quadrature modulation for the stream of the extension PL frame of the channel ch#n received from the frame generation unit $34_n$, and transmits resultant modulation signals in a transmission band (frequency band) of the channel ch#n as a channel stream s#n of the channel ch#n.

The symbol clock generation unit 26 generates a symbol clock corresponding to a clock of a rate of symbols, and supplies the generated symbol clock to the time associated information generation unit 27.

The time associated information generation unit 27 generates ISSY such as ISCR as time associated information in synchronization with the symbol clock received from the symbol clock generation unit 26, and supplies the generated ISSY to the channel processing units $23_1$ through $23_N$ (synchronization units $31_1$ through $31_N$ of the channel processing units $23_1$ through $23_N$).

Accordingly, identical ISSY such as identical ISCR is supplied to all of the channel processing units $23_1$ through $23_N$ at each time.

<Transmitting Process>

Figure 3:
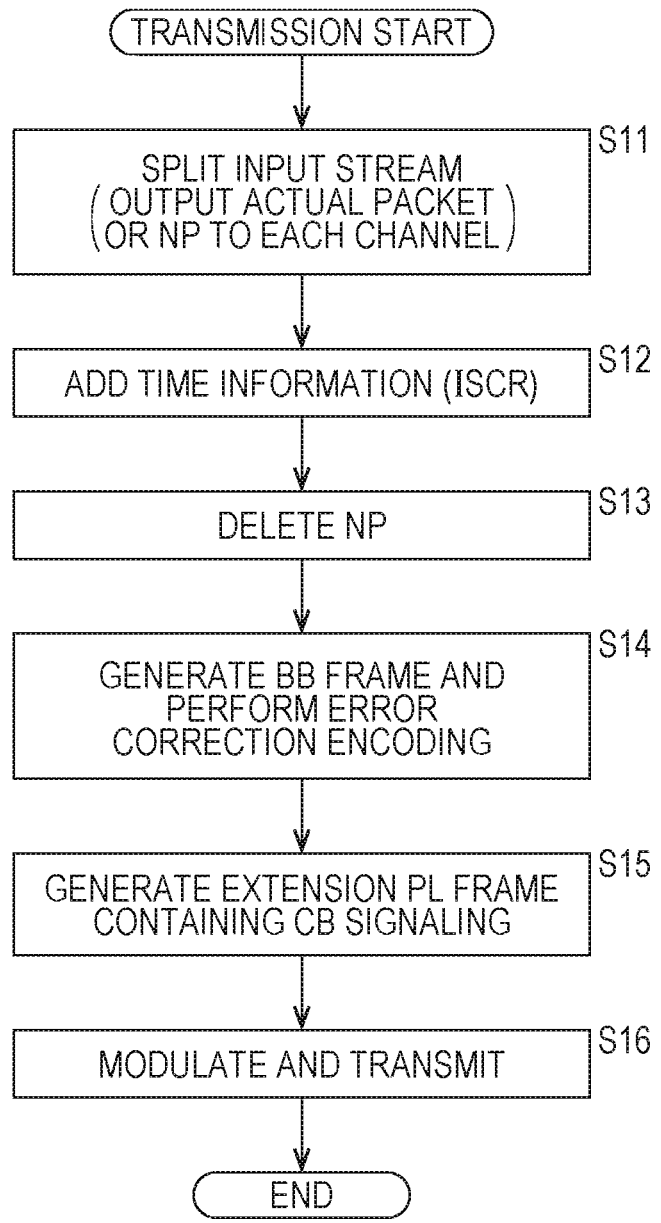
FIG. 3 is a flowchart describing a process (transmitting process) performed by the transmitting device 11.

FIG. 3 is a flowchart describing a process (transmitting process) performed by the transmitting device 11 in FIG. 2.

In step S11, the splitter 21 distributes TS packets of an input stream supplied thereto to one channel of N channels ch#1 through ch#N, and distributes NPs to all of the other channels to split the input stream to split the input stream into split streams of the N channels ch#1 through ch#N each of which contains a mixture of the TS packets of the input stream and NPs. Then, the splitter 21 supplies the split stream of the channel ch#n to the buffer $22_n$.

The buffer $22_n$ sequentially stores the split stream of the channel ch#n supplied from the splitter 21, and sequentially supplies the stored split stream of the channel ch#n to the channel processing unit $23_n$. Then, the process proceeds from step S11 to step S12.

In step S12, the synchronization unit $31_n$ of the channel processing unit $23_n$ adds ISCR received from the time associated information generation unit 27 to each end of packets of the split stream of the channel ch#n received from the buffer $22_n$, and supplies the resultant split stream of the channel ch#n to the NP deletion unit $32_n$ as a post-synchronization stream of the channel ch#n. Then, the process proceeds to step S13.

In step S13, the NP deletion unit $32_n$ deletes NPs from the post-synchronization stream of the channel ch#n (split stream containing ISCR added to each packet) received from the synchronization unit $31_n$, and supplies the resultant stream to the FEC unit $33_n$ as an NP deletion stream of the channel ch#n. Then, the process proceeds to step S14.

In step S14, the FEC unit $33_n$ adds a BB header to one or more packets of the NP deletion stream of the channel ch#n supplied from the NP deletion unit $32_n$, and adds in-band signaling to these packets as necessary to generate a stream of a BB frame.

The FEC unit $33_n$ performs error correction encoding for a target of the BB frame to obtain an FEC frame of the channel ch#n, and maps the FEC frame in units of a symbol constituted by a predetermined number of bits to any one of signal points on a constellation defined by a modulation system of quadrature modulation. The FEC unit $33_n$ supplies the stream of the FEC frame of the channel ch#n after the mapping to the frame generation unit $34_n$. Then, the process proceeds from step S14 to step S15.

In step S15, the frame generation unit $34_n$ generates an extension PL header containing MODCOD, TYPE, and CB signaling.

The frame generation unit $34_n$ adds the extension PL header to the FEC frame of the channel ch#n received from the FEC unit $33_n$ to generate a stream of the extension PL frame, and supplies the generated stream to the MOD unit $35_n$. Then, the process proceeds to step S16.

In step S16, the MOD unit $35_n$ performs quadrature modulation for the stream of the extension PL frame of the channel ch#n received from the frame generation unit $34_n$, and transmits resultant modulation signals of the channel ch#n as a channel stream s#n of the channel ch#n to end the process.

Steps S11 through S16 of the transmitting process in FIG. 3 are performed via a pipe line.

As described above, the transmitting device 11 splits an input stream into split streams of the plurality of N channels ch#1 through ch#N each of which contains a mixture of TS packets of the input stream and NPs, and deletes the NPs contained in the split streams of the respective channels ch#n to transmit NP deletion streams.

In this case, the data rate of the NP deletion stream of each of the channels ch#n becomes lower than the data rate of the input stream by a volume of the deleted NPs. Accordingly, transmission of the high-data-rate input stream is achievable via a plurality of transmission paths each of which does not have a wide transmission band.

Moreover, a circuit constituting the FEC unit $33_n$ need not have a high processing speed to perform error correction encoding for a target of the NP deletion stream (BB frame generated from NP deletion stream) of the channel ch#n.

<Configuration Example of Receiving Device 12>

Figure 4:
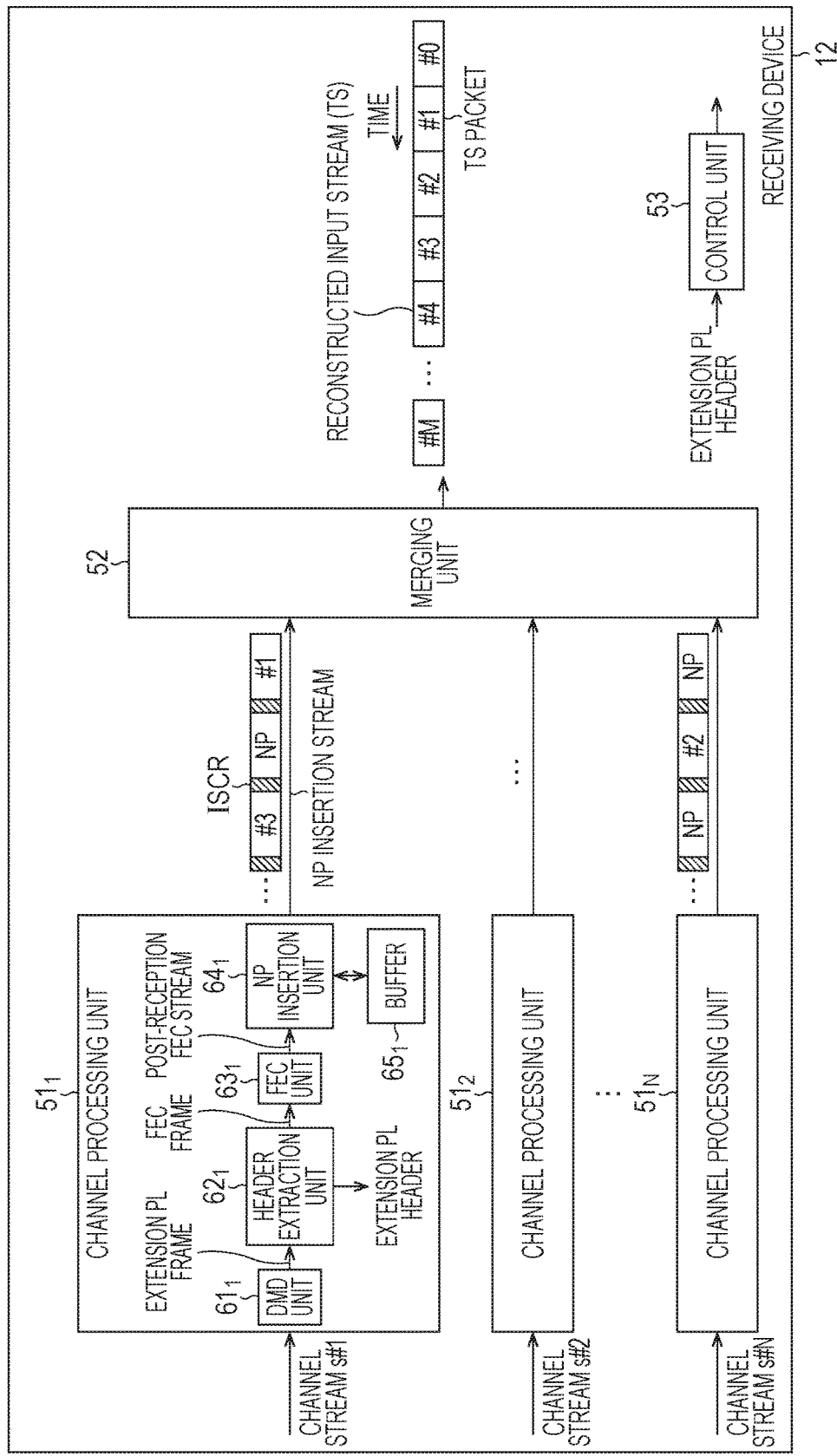
FIG. 4 is a block diagram illustrating a configuration example of a receiving device 12.

FIG. 4 is a block diagram illustrating a configuration example of the receiving device 12 in FIG. 1.

As illustrated in FIG. 4, the receiving device 12 includes N channel processing units $51_1$ through $51_N$, a merging unit 52, and a control unit 53.

The channel processing unit $51_n$ receives and processes the channel stream s#n of the channel ch#n transmitted from the transmitting device 11.

More specifically, the channel processing unit $51_n$ includes a de-modulation (DMD) unit $61_n$, a header extraction unit $62_n$, an FEC unit $63_n$, an NP insertion unit $64_n$, and a buffer $65_n$.

The DMD unit $61_n$ receives the channel stream s#n of the channel ch#n transmitted from the transmitting device 11, and demodulates the channel stream s#n of the channel ch#n modulated by the MOD unit $35_n$ in FIG. 2. Then, the DMD unit $61_n$ supplies a stream of an extension PL frame to the header extraction unit $62_n$ as demodulation signals of the channel ch#n obtained by the demodulation.

The header extraction unit $62_n$ extracts an extension PL header containing CB signaling and others from the extension PL frame (stream of extension PL frame) received from the DMD unit $61_n$, and supplies the extracted extension PL header the control unit 53.

The header extraction unit $62_n$ further extracts a mapped FEC frame of the channel ch#n from the extension PL frame (stream of extension PL frame), and supplies the extracted FEC frame to the FEC unit $63_n$.

The FEC unit $63_n$ demaps the mapped FEC frame of the channel ch#n received from the header extraction unit $62_n$. The FEC unit $63_n$ further decodes error correction codes of the demapped FEC frame of the channel ch#n performed as error correction for error correction encoding by the FEC unit $33_n$ in FIG. 2. By this method, the FEC unit $63_n$ restores the NP deletion stream in the form of the BB frame obtained by the FEC unit $33_n$ in FIG. 2, and supplies the restored NP deletion stream to the NP insertion unit $64_n$ as a post-reception FEC stream of the channel ch#n.

The NP insertion unit $64_n$ supplies the post-reception FEC stream of the channel ch#n received from the FEC unit $63_n$ to the buffer $65_n$, and stores the post-reception FEC stream in the buffer $65_n$.

Then, the NP insertion unit $64_n$ outputs the packets of the post-reception FEC stream stored in the buffer $65_n$ or NPs as necessary to insert NPs into the post-reception FEC stream, i.e., NP deletion stream (in the form of BB frame) in an appropriate manner.

By this method, the NP insertion unit $64_n$ restores a post-synchronization stream of the channel ch#n supplied from the synchronization unit $31_n$ to the NP deletion unit 32 in FIG. 2, and supplies the restored post-synchronization stream to the merging unit 52 as an NP insertion stream of the channel ch#n.

This NP insertion stream of the channel ch#n is a stream generated to restore the post-synchronization stream of the channel ch#n supplied from the synchronization unit $31_n$ to the NP deletion unit $32_n$, and therefore contains ISCR added to each end of the packets of the NP insertion stream of the channel ch#n.

The buffer $65_n$ temporarily stores the packets of the post-reception FEC stream of the channel ch#n supplied from the NP insertion unit $64_n$ under control of the NP insertion unit $64_n$, and reads the stored packets.

The merging unit 52 arranges packets contained in the NP insertion streams of the channels ch#1 through ch#N other than NPs inserted by the NP insertion units $64_1$ through $64_N$ in the order of transmission time indicated by ISCR added to each end of the packets of the NP insertion streams of the channels ch#1 through ch#N supplied from the NP insertion units $64_1$ through $64_N$ of the channel processing units $51_1$ through $51_N$ to reconstruct and output an input stream constituted by a plurality of TS packets such as #0, #1 . . . .

The control unit 53 controls the channel processing units $51_1$ through $51_N$ based on MODCOD, TYPE, and CB signaling contained in the extension PL header supplied from the channel processing unit $51_n$ (header extraction unit $62_n$ of channel processing unit $51_n$).

When the NP deletion unit $32_n$ of the transmitting device 11 (FIG. 2) deletes NPs from the post-synchronization stream of the channel ch#n to generate the NP deletion stream of the channel ch#n, deleted null packets (DNP) constituted by 1 byte, for example, which indicates the number of NPs deleted from an interval between a packet and a subsequent packet of the NP deletion stream of the channel ch#n, is added to the head of the corresponding packet. The NP insertion unit $64_n$ of the receiving device 12 inserts the number of NPs indicated by DNP into the post-reception FEC stream, i.e., the NP deletion stream (in the form of BB frame).

<Receiving Process>

Figure 5:
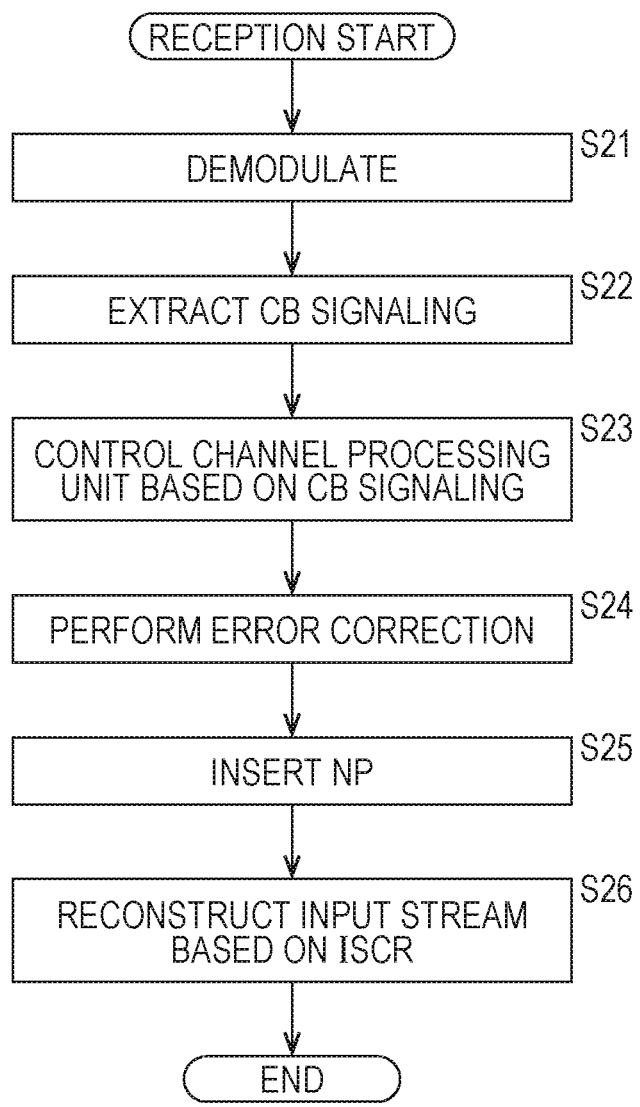
FIG. 5 is a flowchart describing an example of a process (receiving process) performed by the receiving device 12.

FIG. 5 is a flowchart describing an example of a process (receiving process) performed by the receiving device 12 in FIG. 4.

In step S21, the DMD unit $61_n$ of the channel processing unit $51_n$ receives the channel stream s#n of the channel ch#n transmitted from the transmitting device 11, and demodulates the channel stream s#n. Then, the DMD unit $61_n$ supplies a stream of an extension PL frame generated from demodulation signals of the channel ch#n obtained by the demodulation to the header extraction unit $62_n$. After completion of step S21, the process proceeds to step 22.

In step S22, the header extraction unit $62_n$ extracts (separates) an extension PL header and a mapped FEC frame of the channel ch#n from the extension PL frame (stream of extension PL frame) received from the DMD unit $61_n$.

Then, the header extraction unit $62_n$ supplies the extension PL header to the control unit 53, and supplies the mapped FEC frame of the channel ch#n to the FEC unit $63_n$. After completion of step S22, the process proceeds to step S23.

In step S23, the control unit 53 controls the channel processing units $51_1$ through $51_N$ based on MODCOD, TYPE, and CB signaling contained in the extension PL header received from the header extraction unit $62_n$. Then, the process proceeds to step S24.

In step S24, the FEC unit $63_n$ demaps the mapped FEC frame of the channel ch#n received from the header extraction unit $62_n$. The FEC unit $63_n$ further performs error correction for the demapped FEC frame of the channel ch#n to restore the NP deletion stream in the form of the BB frame, and supplies the restored stream to the NP insertion unit $64_n$ as a post-reception FEC stream of the channel ch#n. Then, process proceeds to step S25.

In step S25, the NP insertion unit $64_n$ receives the post-reception FEC stream of the channel ch#n from the FEC unit $63_n$. The NP insertion unit $64_n$ supplies the received post-reception FEC stream to the buffer $65_n$, and stores this stream in the buffer $65_n$. The NP insertion unit $64_n$ further outputs packets of the post-reception FEC stream stored in the buffer $65_n$ or NPs to restore a post-synchronization stream of the channel ch#n, i.e., a stream containing NPs inserted in an appropriate manner into the post-reception FEC stream (NP deletion stream (in the form of BB frame)). The NP insertion unit $64_n$ supplies the restored stream to the merging unit 52 as an NP insertion stream of the channel ch#n.

Then, the process proceeds from step S25 to step S26, where the merging unit 52 reconstructs and outputs an input stream constituted by the plurality of TS packets such as #0, #1 . . . based on ISCR added to each end of the packets of the NP insertion stream of the channels ch#1 through ch#N supplied from the NP insertion units $64_1$ through $64_N$ to end the process.

The processes in steps S21 through S26 in FIG. 5 are performed via a pipe line.

It is assumed herein that the transmission system in FIG. 1 includes the five transmitting devices 11, for example, and that each of the five transmitting devices 11 splits an input stream into split streams of two channels to transmit channel streams s#1 and s#2 obtained from the split streams of the two channels.

It is further assumed that the channel streams s#1 and s#2 of the two channels are generated from an input stream different for each of the five transmitting devices 11, and transmitted in two transmission bands included in ten transmission bands and not overlapping with each other, for example.

In this case, the receiving device 12 is difficult to determine which of input streams is reconstructed by a channel stream transmitted in any of the ten transmission bands when each of the channel streams does not contain CB signaling.

Accordingly, the receiving device 12 is required to determine whether or not a desired input stream (split streams of two channels constituting the input stream (channel streams obtained from the split streams)) has been received based on confirmation of reception of accurate service information (SI) after receiving channel streams of two channels and reconstructing a TS as an input stream for each of $_{10}C_2=45$ possible combinations of two transmission bands selected from the ten transmission bands in order to obtain the desired input stream, for example.

However, a considerable time is required for the receiving device 12 to obtain a desired input stream based on confirmation of reception of accurate SI when a TS as an input stream is reconstructed from received channel streams for all of possible combinations of two transmission bands selected from the ten transmission bands. This method is far from an appropriate stream processing method.

According to the present technology, therefore, CB signaling specifying CB is inserted into the channel streams to identify split streams (channel streams obtained from split streams) constituting an input stream, and thereby perform appropriate processing without the need of reconstruction of a TS as an input stream.

CB signaling may be inserted into an extension PL header of an expansion PL frame, for example.

<Extension PL Frame>

Figure 6:
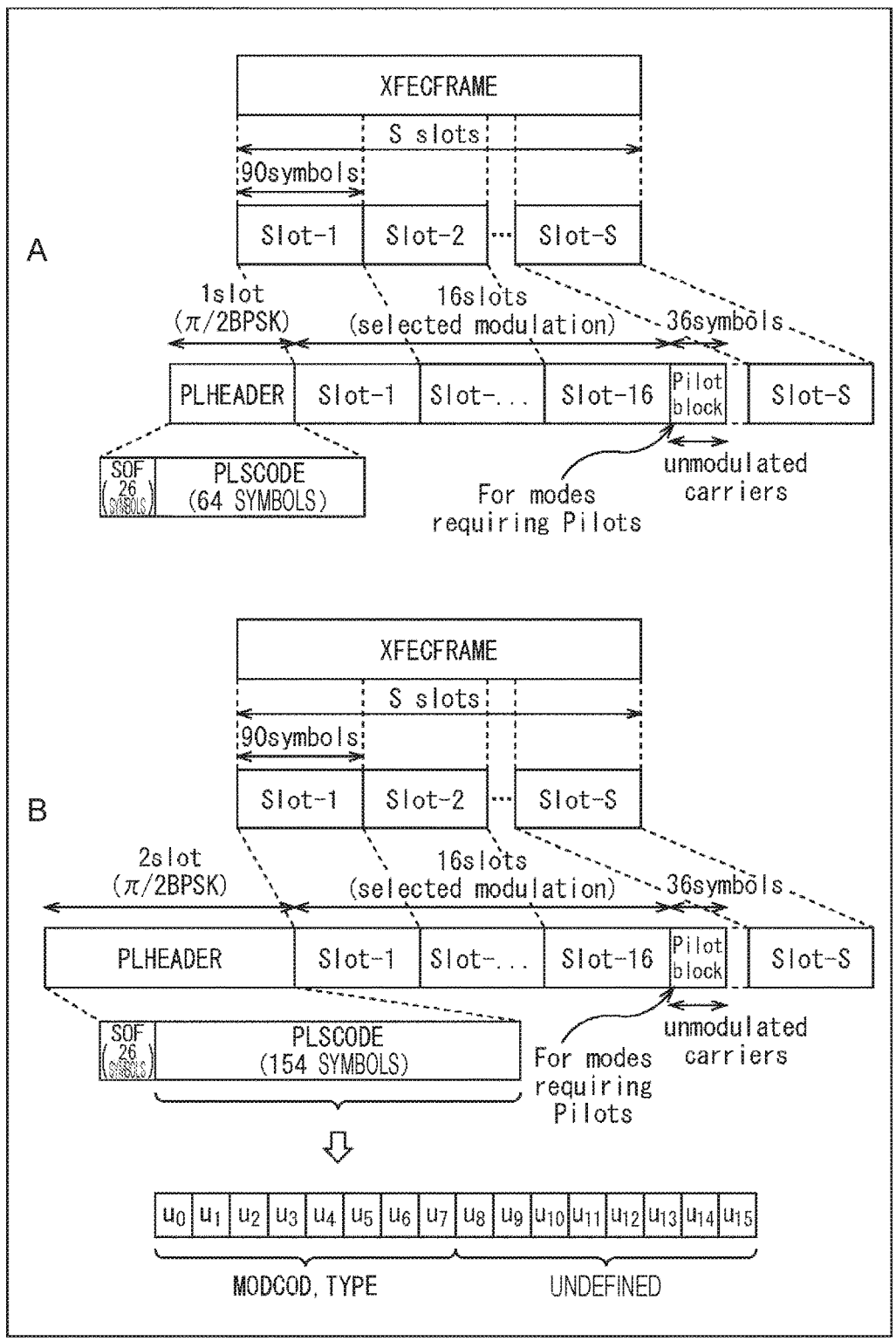
FIG. 6 is a view illustrating a format of a PL frame.

FIG. 6 is a view illustrating a format of a PL frame.

A part A in FIG. 6 shows a format of a PL frame (PL frame other than extension PL frame) specified in DVB-S2.

The PL frame includes a 1-slot PL header (PLHEADER), an FEC frame (XFECFRAME) divided by slots, and a necessary pilot block.

One slot is constituted by 90 symbols.

The 1-slot PL header is constituted by SOF (Start of Frame) containing 26 symbols, and physical layer signaling (PLS) containing 64 symbols.

The PLS of the PL header contains information bits constituted by 7 bits. Five bits in the information bits constituted by 7 bits and contained in the PLS of the PL header represent MODCOD (of FEC frame divided by slots), while the remaining two bits represent TYPE.

A part B in FIG. 6 shows a format of an extension PL frame specified in DVB-S2.

In the extension PL frame, the 1-slot PL header of the PL frame shown in the part A in FIG. 6 is extended into a 2-slot extension PL header.

The 2-slot PL header is constituted by SOF containing 26 symbols, and PLS containing 154 symbols.

The PLS of the extension PL header contains information bits constituted by 16 bits.

It is assumed herein that respective bits of the 16-bit information bits contained in the PLS of the extension PL header are expressed as $u_0$, $u_1$, and up to $u_{15}$ from the highest order.

Intended uses of the eight high-order bits $u_0$ through $u_7$, in the 16-bit information bits $u_0$ through $u_1$ are already defined in DVB-S2x.

More specifically, the six bits $u_0$ through $u_5$ of the high-order 8 bits $u_0$ through $u_7$ represent MODCOD, while the remaining 2 bits represent TYPE.

The low-order 8 bits $U_8$ through $u_{15}$ of the 16-bit information bits $u_0$ through $u_{15}$ contained in the PLS of the extension PL header are undefined in DVB-S2x. Accordingly, these low-order 8 bits $u_8$ through $u_{15}$ may be utilized for representation of CB signaling.

<CB Signaling>

Figure 7:
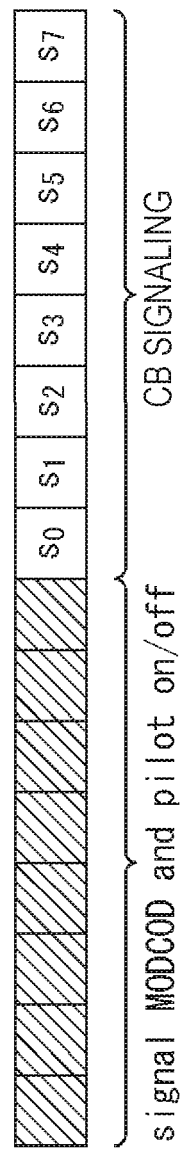
FIG. 7 is a view illustrating bits $u_0$ through $u_{15}$ of 16-bit information contained in PLS of an extension PL header.

FIG. 7 is a view illustrating the 16-bit information bits $u_0$ through $u_{15}$ included in the PLS of the extension PL header and containing the low-order 8 bits $u_8$ through $u_{15}$ used for representation of CB signaling.

As illustrated in FIG. 7, the 8 low-order bits $u_8$ through $u_{15}$ contained in the 16-bit information bits $u_0$ through $u_{15}$ of the PLS of the extension PL header and used for representation of CB signaling are hereinafter expressed as $s_0$, $s_1$, and up to $s_7$ from the highest order bit.

FIG. 8 is a view illustrating a first example of CB signaling.

The bit $s_0$ of CB signaling in the first example represents whether or not CB is being performed.

For example, when CB is being performed, i.e., a stream (containing FEC frame) contained in the extension PL frame is a split stream of an input stream, the bit $s_0$ is set to 1.

When CB is not being performed, i.e., the stream contained in the extension PL frame is an input stream (not a split stream), the bit $s_0$ is set to 0, for example.

When CB is not being performed in a state of the bit $s_0$ set to 0, the bits $s_1$ through $s_7$ are not used (undefined).

When CB is being performed in a state of the bit $s_0$ set to 1, the bits $s_1$ through $s_7$ represent signature information unique for each input stream constituted by split streams contained in the extension PL frame (and containing FEC frame).

Signature information is information functioning as identification information for identifying an input stream, for example. Split streams of a plurality of channels split from an identical input stream are identified based on identification information about the input stream as signature information.

An identical value (information) is given to signature information for each of extension PL frames each containing a corresponding split stream of a plurality of channels as a stream split from an identical input stream. Accordingly, the receiving device 12 receives channel streams transmitted in a transmission band containing extension PL frames to which identical signature information is given, and obtains split streams reconstructing the input stream to perform appropriate processing for reconstruction of the input stream.

According to CB signaling of the first example, signature information is constituted by seven bits of the bit $s_1$ through $s_7$. In this case, $2^7=128$ input streams (split streams constituting respective input streams) are identifiable based on the 7-bit signature information.

FIG. 9 is a view illustrating a second example of CB signaling.

It is assumed in FIG. 9 that a number N of channels for splitting streams of an input stream is either 2 or 3 in CB.

Bits $s_0$ and $s_1$ of CB signaling according to the second example represent whether or not CB is being performed, and indicate location information about transmission bands (frequency bands) for transmitting other split streams constituting the input stream when CB is being performed.

A transmission band for transmitting a frame of interest (channel stream of frame of interest) constituted by a certain extension PL frame is also referred to as a band of interest, while an input stream reconstructed by split frames contained in a frame of interest is also referred to as an input stream of interest.

Split streams (channel streams obtained from split streams) other than split streams contained in a frame of interest and constituting an input stream of interest are sent (transmitted) in transmission bands other than a band of interest. In this case, location information contained in a frame of interest in CB signaling indicates these transmission bands, i.e., locations of the transmission bands of the other split streams.

While CB is being performed, the bits $s_0$ and $s_1$ are set to values other than 0 and 0, respectively, for example.

More specifically, during CB for splitting an input stream into split streams of two channels, the bits $s_0$ and $s_1$ are set to 0 and 1, respectively, for example, when the split stream of the channel (different split stream) different from the split stream of the channel contained in the frame of interest is transmitted in a transmission band of higher frequencies than the band of interest.

On the other hand, during CB for splitting an input stream into split streams of two channels, the bits $s_0$ and $s_1$ are set to 1 and 0, respectively, for example, when the split stream of the channel different from the split stream of the channel contained in the frame of interest is transmitted in a transmission band of lower frequencies than the band of interest.

Furthermore, the bits $s_0$ and $s_1$ are set to 1 and 1, respectively, for example, during CB for splitting the input stream into split streams of three channels.

According to CB signaling for splitting the input stream into split streams of three channels in the second example, the bits $s_0$ and $s_1$ set to 1, 1, respectively, do not contain location information about split streams of the other two channels.

It is allowed to define that the bits $s_0$ and $s_1$ of CB signaling according to the second example represent a state of whether or not CB is being performed, location information, and the channel number N of the split streams (N=2 or 3 in this example).

When CB is not being performed, the bits $s_0$ and $s_1$ are set to 0 and 0, respectively, for example.

When CB is not being performed in the state of the bits $s_0$ and $s_1$ set to 0, 0, respectively, the bits $s_2$ through $s_7$ are not used.

When CB is performed in a state of bits $s_0$ and $s_1$ set to values other than 0 and 0, respectively, the bits $s_2$ through $s_7$ represent signature information.

According to CB signaling in the second example, signature information is constituted by the six bits $s_2$ through $s_7$. In this case, $2^6=64$ input streams (split streams constituting each of input streams) are identifiable based on this 6-bit signature information.

FIG. 10 is a view illustrating a third example of CB signaling.

Similarly to the example illustrated in FIG. 9, the number N of channels for splitting an input stream into split streams by CB in FIG. 10 is either 2 or 3.

Bits $s_0$, $s_1$, and $s_2$ of CB signaling according to the third example represent a state of whether or not CB is being performed, and indicate location information about transmission bands for transmitting other split streams constituting the input stream when CB is being performed.

While CB is being performed, the bits $s_0$, $s_1$, and $s_2$ are set to values other than 0, 0, and 0, respectively, for example.

More specifically, during CB for splitting an input stream into split streams of two channels, the bits $s_0$, $s_1$ and $s_2$ are set to 0, 0 and 1, respectively, for example, when the split stream of the channel (different split stream) different from the split stream of the channel contained in the frame of interest is transmitted in a transmission band of higher frequencies than the band of interest.

During CB for splitting an input stream into split streams of two channels, the bits $s_0$, $s_1$ and $s_2$ are set to 0, 1 and 0, respectively, for example, when the split stream of the channel different from the split stream of the channel contained in the frame of interest is transmitted in a transmission band of lower frequencies than the band of interest.

During CB for splitting an input stream into split streams of three channels, the bits $s_0$, $s_1$ and $s_2$ are set to 1, 0 and 1, respectively, for example, when each of the split streams of the two channels different from the split stream of the channel contained in the frame of interest is transmitted in a transmission band of higher frequencies than the band of interest.

During CB for splitting an input stream into split streams of three channels, the bits $s_0$, $s_1$ and $s_2$ are set to 1, 1 and 0, respectively, for example, when each of the split streams of the two channels different from the split stream of the channel contained in the frame of interest is transmitted in a transmission band of lower frequencies than the band of interest.

During CB for splitting an input stream into split streams of three channels, the bits $s_0$, $s_1$ and $s_2$ are set to 1, 1 and 1, respectively, for example, when one and the other of the split streams of the two channels different from the split stream of the channel contained in the frame of interest are transmitted in a transmission band of lower frequencies than the band of interest, and in a transmission band of higher frequencies than the band of interest, respectively.

It is allowed to define that the bits $s_0$, $s_1$ and $s_2$ of CB signaling according to the third example represent a state of whether or not CB is being performed, location information, and the channel number N of the split streams (N=2 or 3 in this example).

According to the example illustrated in FIG. 10, settings of 0, 1, and 1, and 1, 0, and 0 are not used for the bits $s_0$, $s_1$ and $s_2$. Accordingly, CB signaling in the example illustrated in FIG. 10 does not use the 8 bits $s_0$ through $s_7$ containing the high order three bits $s_0$, $s_1$ and $s_2$ set to 0, 1, and 1, and 8 bits containing the high order three bits $s_0$, $s_1$ and $s_2$ set to 1, 0, and 0.

When CB is not being performed, the bits $s_0$ and $s_1$ and $s_2$ are set to 0, 0 and 0, respectively, for example.

When CB is not being performed in a state of the bits $s_0$, $s_1$ and $s_2$ set to 0, 0 and 0, respectively, the bits $s_2$ through $s^7$ are not used.

When CB is being performed in the state of the bits $s_0$, $s_1$ and $s_2$ set to values other than 0, 0 and 0, respectively (except for settings of 0, 1, and 1, and 1, 0, and 0 in the example of FIG. 10), the bits $s_3$ through $s_7$ represent signature information.

According to CB signaling in the third example, signature information is constituted by the five bits $s_3$ through $s_7$. In this case, $2^b=32$ input streams (split streams constituting each of input streams) are identifiable based on this 5-bit signature information.

On the transmitting device 11 side, the frame generation unit 34 produces an extension PL header containing CB signaling described above, and adds the generated extension PL header to an FEC frame to generate an extension PL frame.

On the receiving device 12 side, the control unit 53 determines whether or not CB is being performed based on CB signaling contained in the extension PL header supplied from the header extraction unit $62_n$ of the channel processing unit $51_n$ of the given channel ch#n.

In other words, it is determined that CB is being performed when the bit $s_0$ is set to 1, and that CB is not being performed when the bit $s_0$ is set to 0, according to CB signaling in the first example.

On the other hand, according to CB signaling in the second example, it is determined that CB is being performed when the bit $s_0$ and $s_1$ are set to values other than 0 and 0, respectively, and that CB is not being performed when the bit $s_0$ and $s_1$ are set to 0 and 0, respectively.

According to CB signaling in the third example, it is determined that CB is being performed when the bit $s_0$, $s_1$ and $s_2$ are set to values other than 0, 0 and 0, respectively, and that CB is not being performed when the bit $s_0$, $s_1$ and $s_2$ are set to 0, 0 and 0, respectively.

When CB is being performed, the control unit 53 receives channel streams in a transmission band other than the transmission band containing channel streams received by the channel processing unit $51_n$, and allows a channel processing unit $51_{n'}$ of a different channel ch#n' to search for channel streams including CB signaling indicating signature information identical to the signature information indicated by the CB signaling included in the extension PL header received from the channel processing unit $51_n$ (header extraction unit $62_n$ of channel processing unit $51_n$).

As a result, the channel processing unit $51_{n'}$ of the different channel ch#n' receives split streams obtained from the channel streams received by the channel processing unit $51_n$, and also different split streams (channel streams generating different split streams) for constituting the input stream.

CB signalings in the second and third examples contain location information as well as signature information. In this case, it is identifiable, based on this location information, whether the transmission band for transmitting the different split streams constituting the input stream together with the split streams (obtained from channel streams) received by the channel processing unit $51_n$ is a transmission band of higher frequencies or lower frequencies than the transmission band (band of interest) for receiving the split streams by the channel processing unit $51_n$. Accordingly, the channel processing unit $51_{n'}$ of the different channel ch#n' is allowed to rapidly search for the different split streams constituting the input stream together with the split streams received by the channel processing unit $51_n$.

Figure 11:
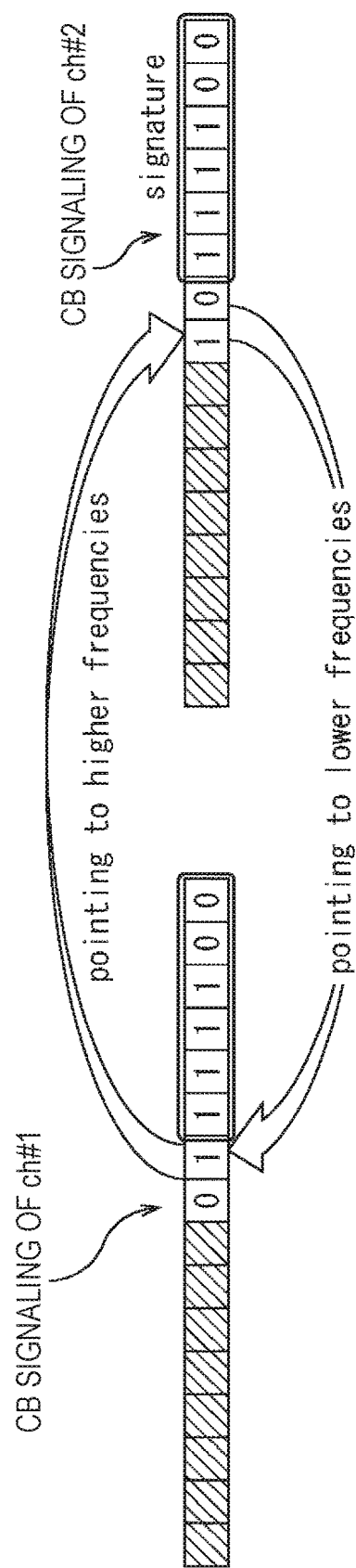
FIG. 11 is a view illustrating an example of CB signaling of CB which splits an input stream into split streams of two channels ch#1 and ch#2.

FIG. 11 is a view illustrating an example of CB signaling in the second example in which CB is performed to split an input stream into split streams of two channels of ch#1 and ch#2.

As described with reference to FIG. 9, the bits $s_2$ trough $s_7$ of CB signaling according to the second example represent signature information. According to the example illustrated in FIG. 11, signature information (bits $s_2$ through $s_7$ of CB signaling) about each split stream of the two channels ch#1 and ch#2 obtained from an identical input stream indicates an identical value such as 111100.

According to the example illustrated in FIG. 11, the bits $s_0$ and $s_1$ of CB signaling of the channel ch#11 are set to 0 and 1, respectively.

As described in the example illustrated in FIG. 9, the bits $s_0$ and $s_1$ contained in CB signaling of the channel ch#1 and set to 0 and 1, respectively, indicate that CB for splitting the input stream into split streams of the two channels ch#1 and ch#2 is being performed, and that the channel ch#2 different from the channel ch#1 uses a transmission band containing higher frequencies than the transmission band of the channel ch#1.

According to the example illustrated in FIG. 11, the bits $s_0$ and $s_1$ of CB signaling of the channel ch#2 are set to 1 and 0, respectively.

As described in the example illustrated in FIG. 9, the bits $s_0$ and $s_1$ contained in CB signaling of the channel ch#2 and set to 1 and 0, respectively, indicate that CB for splitting the input stream into split streams of the two channels ch#11 and ch#2 is being performed, and that the channel ch#1 different from the channel ch#2 uses a transmission band of lower frequencies than the transmission band of the channel ch#2.

When the receiving device 12 receives the channel ch#1 earlier than the channel ch#2, for example, the channel ch#2 to which 111100 is given as signature information is searched within a transmission band higher than the transmission band of the channel ch#1 based on CB signaling of the channel ch#1.

When the receiving device 12 receives the channel ch#2 earlier than the channel ch#1, for example, the channel ch#1 to which 111100 is given as signature information is searched within a transmission band lower than the transmission band of the channel ch#2 based on CB signaling of the channel ch#2.

<Description of Computer According to Present Technology>

A series of processes described herein may be executed either by hardware or software. When the series of processes are performed by software, programs constituting the software are installed in a general-purpose computer, for example.

Figure 12:
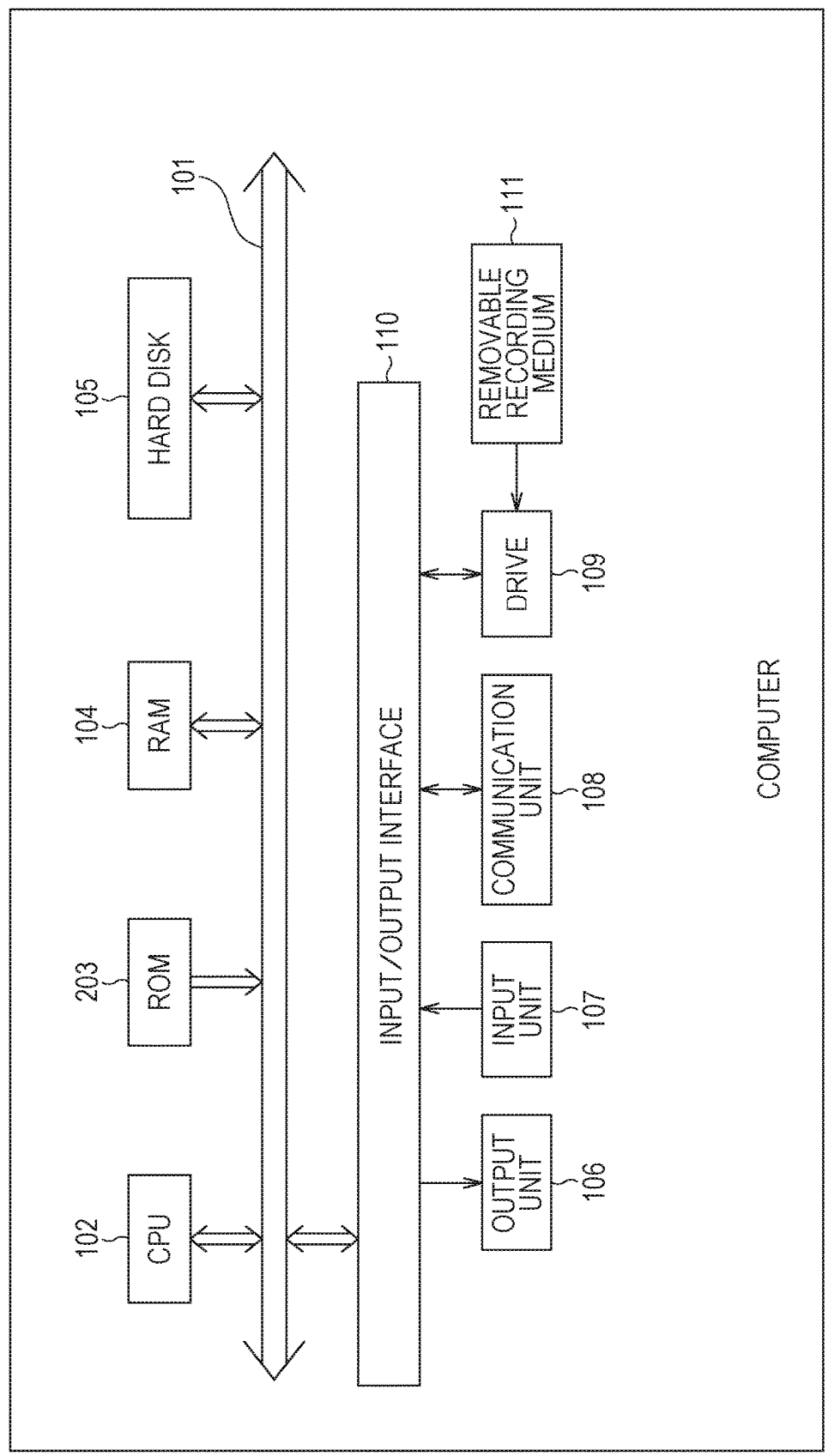
FIG. 12 is a block diagram illustrating a configuration example of a computer according to an embodiment of the present technology.

FIG. 12 illustrates a configuration example of a computer which executes the series of processes described herein under the programs installed in the computer according to an embodiment.

The programs may be recorded in advance in a hard disk 105 or a ROM 103 as a recording medium included in the computer.

Alternatively, the programs may be stored (recorded) in a removable recording medium 111. The removable recording medium 111 may be provided as so-called package software. The removable recording medium 111 is constituted by a flexible disk, a compact disc read only memory (CD-ROM), magneto optical (MO) disk, a digital versatile disc (DVD), a magnetic disk, or a semiconductor memory, for example.

The programs may be downloaded to the computer via a communication network or a broadcasting network, and installed into the built-in hard disk 105, rather than installed into the computer from the removable recording medium 111 in the manner described above. More specifically, the programs may be wirelessly transferred to the computer from a download site via a satellite for digital satellite service, or may be transferred to the computer by wire through a network such as a LAN (Local Area Network) and the Internet.

The computer includes a central processing unit (CPU) 102 to which an input/output interface 110 is connected via a bus 101.

When an instruction is input to the CPU 102 from a user via the input/output interface 110 by operation of an input unit 107 or by other methods, the CPU 102 executes the programs stored in the read only memory (ROM) 103 in response to the instruction. Alternatively, the CPU 102 loads the programs stored in the hard disk 105 into a random access memory (RAM) 104 and executes the loaded programs.

According to this structure, the CPU 102 executes processes shown in the foregoing flowcharts, or processes performed by using the structures illustrated in the foregoing block diagrams. The CPU 102 outputs the processing results from an output unit 106 via the input/output interface 110 or transmits the processing results from a communication unit 108, and records the processing results in the hard disk 105 as necessary, for example.

The input unit 107 is constituted by a keyboard, a mouse, a microphone or the like. The output unit 106 is constituted by a liquid crystal display (LCD), a speaker or the like.

The processes in the present specification executed by the computer under the programs need not be performed in time series in the order described in the flowcharts. Accordingly, the processes executed by the computer under the programs include processes executed in parallel or individually (such as parallel processes or processes by objects).

The programs may be processed only by one computer (processor), or may be separately processed by a plurality of computers. In addition, the programs may be transferred to and executed by a remote computer.

According to the present specification, the system refers to a collection of plural constituent elements (such as devices and modules (parts)). In this case, all of the constituent elements are not required to be included in an identical housing. Accordingly, multiple devices accommodated in separate housings and connected via a network, and one device including multiple modules accommodated within one housing are both regarded as systems.

Embodiments of the present technology are not limited to the specific embodiment described herein. Various modifications and changes may be made without departing from the subject matters of the present technology.

For example, the present technology may adopt a cloud computing structure where a plurality of devices share one function and perform the function in cooperation with each other via a network.

The respective steps discussed with reference to the foregoing flowcharts may be shared and executed by multiple devices rather than executed by one device.

When multiple processes are contained in one step, the multiple processes contained in the one step may be shared and executed by multiple devices rather than executed by one device.

According to this embodiment, the input stream is constituted by a TS. However, the input stream may be a stream constituted by a plurality of packets other than a TS.

According to this embodiment, NPs are inserted at the time of splitting of an input stream by the splitter 21, and then are deleted by the NP deletion unit 32$_n$.

However, the input stream may be split by the splitter 21 without insertion of NPs. In this case, the NP deletion unit 32$_n$ of the channel processing unit 23$_n$ may be eliminated.

According to this embodiment, ISCR is added to each packet of a split stream by the synchronization unit 31$_n$. However, ISCR may be added to only a packet of a part of a split stream, or need not be added to any packet. When ISCR is not added to any packet, the synchronization unit 31$_n$ of the channel processing unit 23$_n$ may be eliminated.

According to this embodiment, an input stream is split in units of a packet. However, an input stream may be split in other predetermined types of units, such as a BB frame, an FEC frame, and a physical layer pipe (PLP).

According to this embodiment, CB signaling is inserted into an extension PL header of an extension PL frame after generation of the extension PL frame.

However, CB signaling may be inserted into a header of a T2/C2 frame after construction of the T2/C2 frame. Alternatively, CB signaling may be inserted into a dummy PL frame (Dummy PLFRAME) allowed to be transmitted in DVB-S2.

According to this embodiment, location information indicates whether a transmission band of different split streams is higher or lower than a band of interest. However, location information may indicate more specific location of a transmission band of different split streams, such as x indicating a higher or lower transmission band than a band of interest by x, for example.

Advantageous effects described in the present specification are presented only by way of example.

Other advantageous effects may be offered.

REFERENCE SIGNS LIST

11 Transmitting device
12 Receiving device
13 Transmission path
21 Splitter
22$_1$ through 22$_N$ Buffer
23$_1$ through 23$_N$ Channel processing unit
26 Symbol clock generation unit
27 Time associated information generation unit
31$_1$ through 31$_N$ Synchronization unit
32$_1$ through 32$_N$ NP deletion unit
33$_1$ through 33$_N$ FEC unit
35$_1$ through 35$_N$ MOD unit
51$_1$ through 51$_N$ Channel processing unit
52 Merging unit
61$_1$ through 61$_N$ DMD unit
63$_1$ through 63$_N$ FEC unit
64$_1$ through 64$_N$ NP insertion unit
65$_1$ through 65$_N$
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. A data processing device comprising:
processing circuitry configured to
split an input stream into a split stream for each of a plurality of channels;
generate a stream including the split stream, and signature information unique for the input stream constituted by the split stream; and
generate a stream of a frame having channel bonding signaling,
wherein
the signature information is contained in an extension header of the frame.

2. The data processing device according to claim 1, wherein the processing circuitry generates the stream that includes the split stream, the signature information, and location information about a transmission frequency band of a split stream constituting the input stream and different from the split stream included in the generated stream that includes the split stream, the signature information and the location information.

3. The data processing device according to claim 1, wherein
the frame is a PL (Physical Layer) frame of DVB-S2, and
the signature information is contained in an extension PL header of the PL frame.

4. The data processing device according to claim 2, wherein
the frame is a PL (Physical Layer) frame of DVB-S2, and
the signature information and the location information are contained in an extension PL header of the PL frame.

5. A data processing method comprising steps of:
splitting, via processing circuitry, an input stream into a split stream for each of a plurality of channels;
generating a stream including the split stream, and signature information unique for the input stream constituted by the split stream; and
generating a stream of a frame having channel bonding signaling,
wherein the signature information is contained in an extension header of the frame.

6. A data processing device comprising:
processing circuitry configured to
    process streams received from at least one transmitting device, wherein the streams are generated by
    splitting an input stream into a split stream for each of a plurality of channels,
    generating a stream including the split stream, and signature information unique for the input constituted by the split stream, and
    generating a stream of a frame having channel bonding signaling,
    wherein the signature information is contained in an extension header of the frame.

7. The data processing device according to claim 6, wherein
the stream includes the split stream, the signature information, and location information about a transmission frequency band of a split stream constituting the input stream and different from the split stream included in the generated stream that includes the split stream, the signature information, and the location information.

8. The data processing device according to claim 6, wherein
the frame is a PL (Physical Layer) frame of DVB-S2, and
the signature information is contained in an extension PL header of the PL frame.

9. The data processing device according to claim 7, wherein
the frame is a PL (Physical Layer) frame of DVB-S2, and
the signature information and the location information are contained in an extension PL header of the PL frame.

10. A data processing method comprising:
splitting, via processing circuitry of a transmitting device, an input stream into a split stream for each of a plurality of channels;
generating, via the processing circuitry, a stream including the split stream, signature information unique for the input stream constituted by the split stream;
generating a stream of a frame having channel bonding signaling;
transmitting, via the processing circuitry, the stream to a data processing device; and
processing, at the data processing device, the stream received from the transmitting device,
wherein the signature information is contained in an extension header of the frame.

* * * * *